May 16, 1967 P. E. OLSON 3,319,750
LOST REVOLUTION CLUTCH IN ONE DIRECTION
Filed June 3, 1965 2 Sheets-Sheet 1
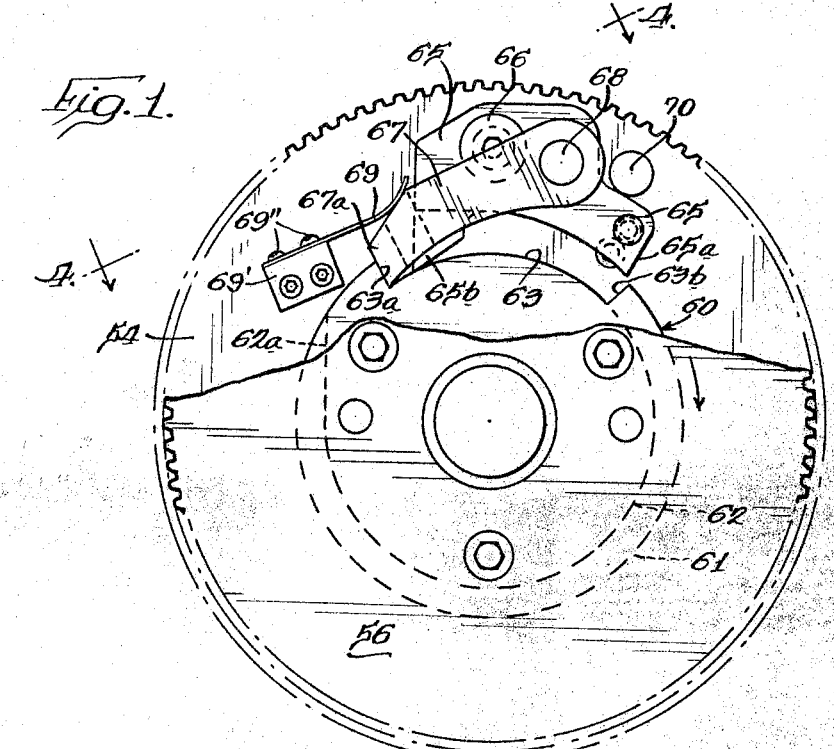
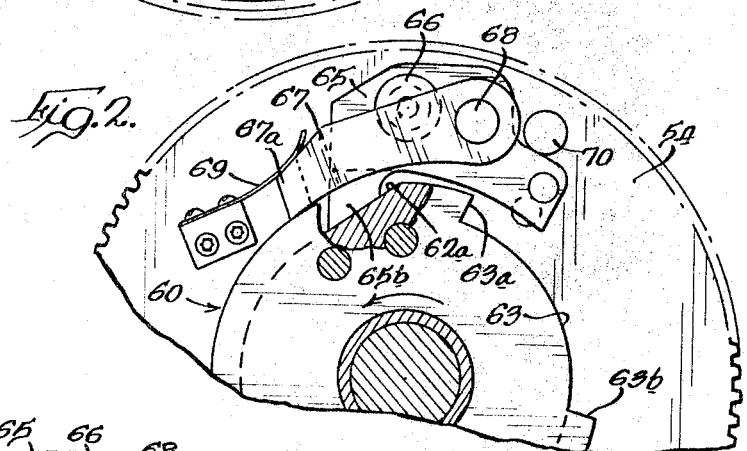
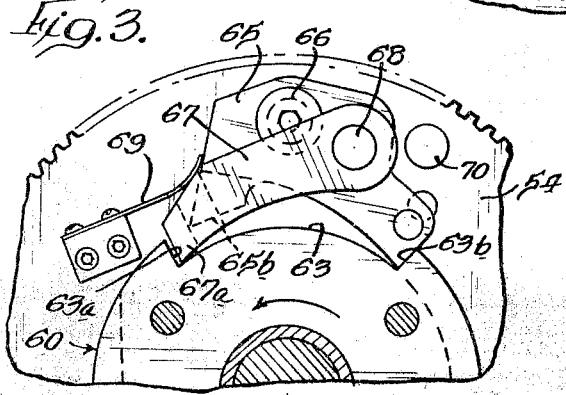
INVENTOR.
Philip E. Olson
BY Hofgren, Wegner,
Allen, Stellman & McCord Att'ys May 16, 1967 P. E. OLSON 3,319,750
LOST REVOLUTION CLUTCH IN ONE DIRECTION
Filed June 3, 1965 2 Sheets-Sheet 2

United States Patent Office 3,319,750
Patented May 16, 1967

3,319,750
LOST REVOLUTION CLUTCH IN ONE DIRECTION
Philip E. Olson, Rockford, Ill., assignor to Rockford Machine Tool Co., a corporation of Illinois
Filed June 3, 1965, Ser. No. 460,993
7 Claims. (Cl. 192—43.1)

This invention relates to a clutch and, more particularly, to a two-way clutch embodying a lost revolution means operable in one direction of rotation.

As an example, this invention is particularly suitable for use in a connection requiring the clutch to have a positive drive in the forward direction, but every time the clutch reverses, the driven member must make one complete revolution before driving the driven member in the reverse direction.

The object of this invention is to provide a two-way lost revolution clutch having two coaxial clutch members.

Another object of this invention is to provide a lost revolution clutch having coaxial driven and driving clutch members so arranged that they will rotate together in a forward direction, and so that the driven member would remain stationary when the driving member is rotated through a first revolution in a reverse direction.

Still another object of this invention is to provide an improved efficient and inexpensive lost revolution clutch.

Further objects and advantages will become readily apparent from the following detailed description taken in connection with the accompanying drawings, in which:

FIG. 1 is the front elevational view of a clutch embodying this invention with the top of the driving clutch member partially cut off to indicate the means interconnecting the two clutch members as they rotate in a clockwise direction;

FIG. 2 is the top cutaway portion of FIG. 1 with the driving clutch member part way through a first revolution in a counterclockwise direction;

FIG. 3 is the top cutaway portion of FIG. 1 showing the positions of the parts while the driving clutch member rotates in a counterclockwise direction;

Figure 4:
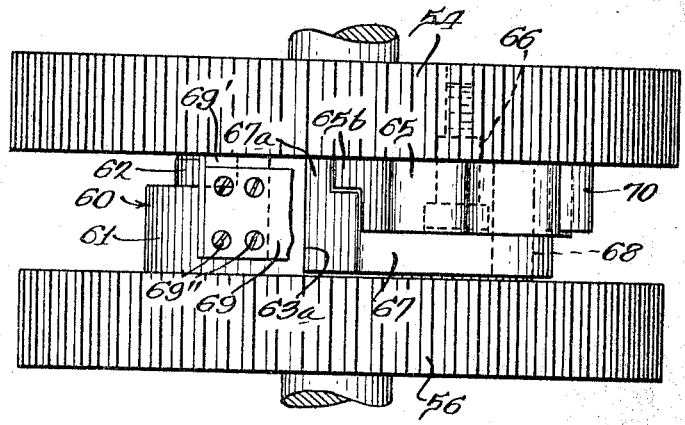
FIG. 4 is a view taken generally along line 4—4 of FIG. 1.

While a preferred embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings for the showing of the lost revolution clutch, the clutch comprises a driven clutch member 54 and a driving clutch member 56.

The clutch members 54 and 56 are rotatably mounted on a common sleeve 57 secured about a common shaft 58. Said clutch members have gear teeth 59 formed in the periphery to form driving connections with driving and driven mechanisms, not shown.

Figure 5:
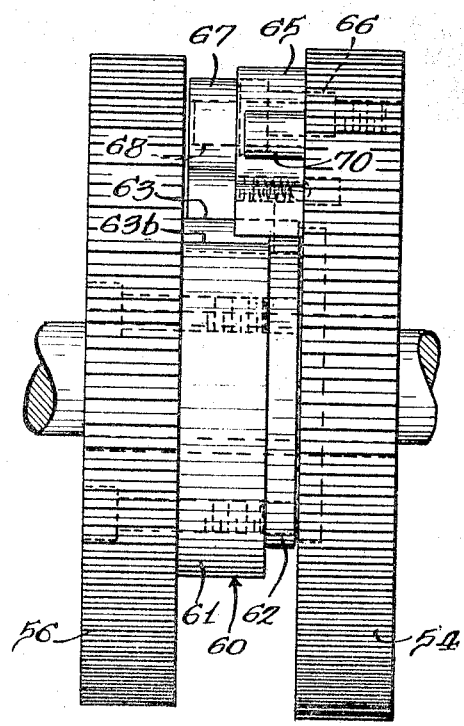
FIG. 5 is a side elevational view of the lost revolution clutch embodying this invention, looking at the right-hand end of FIG. 1.

A driving cam 60, having a substantially circular configuration, is fixedly attached to the inside face of the driving clutch member 56. As best seen in FIG. 5, the cam 60 faces the driven clutch member 54 when the clutch members 54 and 56 are mounted for operation on the common sleeve 57.

The circular cam 60 has an arcuate recess 63 forming clutch shoulders 63a and 63b which, as described more fully hereinafter, form driving elements on the driving member 56. The cam 60 also has a narrow arcuate surface 62 of reduced diameter along its inner face extending from the shoulder 63b of recess 63 around to a point short of the shoulder 63a where a rise 62a extends out to the periphery of cam 60. The surfaces 62 and 62a form a part of the control for the clutch as will appear as this description proceeds.

To cooperate with the driving member clutch shoulders or drive elements 63a and 63b to form a reversible drive connection between the parts 56 and 54, the driven member 54 is provided with a first clutch pawl or driven element 65 pivotally mounted on the inner face of the driven clutch member 54 by a pin 66. As shown best in FIGS. 1 to 3, this clutch pawl has a right-hand end 65a interengageable with the clutch shoulder 63b when the driving member 56 rotates in a counterclockwise direction. The pawl 65 has a left-hand end 65b of reduced width operating against the arcuate cam surface 62 and the rise 62a as well as a short portion 61a of the periphery of cam 60 to cooperate therewith to form a part of the control for the clutch pawls.

A reverse rotation drive pawl or element 67 is pivotally mounted on the clutch pawl 65 by a pin 68 and has a left-hand end 67a (FIGS. 1 to 3) interengageable with the driving clutch shoulder 63a when the driving member 56 rotates in a clockwise direction. As shown in FIG. 4, the end 67a is wider than the rest of the pawl. A leaf spring 69 is carried on a block 69a secured to the driven member 54 by screws 69b and engages the adjacent surface 67b of the drive pawl 67 to maintain the end of the pawl in engagement with the peripheral surface 61 and the recess 63 of the cam 60. The spring 69 also exerts a force tending to swing the clutch pawl 65 into the position shown in FIG. 1 where the movement of the clutch pawl end 65a out of the recess 63 is limited by a pin 60 extending from the inner face of the driven member 54.

In operation of this device, assume the driving clutch member 56 having gear teeth 59 at its periphery is driven from the periphery in a clockwise direction as viewed in FIGS. 1 to 3. When the driving clutch member 56 is rotating in a clockwise direction, the end 67a of the drive pawl 67 engages the shoulder 63a at the left-hand end of the recess 63 of the cam 60 to drive the driven clutch member 54 in a clockwise direction, the leaf spring 69 having pressed the clutch pawl 67 against the surface 63 of the cam 60.

When a force is applied to the clutch pawl 65 by the clockwise rotation of the driving clutch member 56, the end 65a of the pawl 65 is moved out of engagement with the shoulder 63b of the cam recess 63 and against the stop pin 70.

Upon completion of the desired clockwise rotation, the driving clutch member 56 may be reversed. On the first revolution of the driving clutch member 56 in a counterclockwise direction, the clutch shoulder 63b on the cam 60 misses engagement with the clutch pawl 65 resulting in a counterclockwise rotation of the driving clutch member 56 without any driving connection with the driven clutch member 54. Thus, when the driving clutch member 56 makes its first counterclockwise revolution, the driven clutch member 54 remains in a standstill position. Near the end of the first counterclockwise revolution of the driving clutch member 56 the end 65b of the clutch pawl 65 rides up on the rise 62a of the cam surface 62 forcing the end 65a downwardly into engagement with the clutch shoulder 63b to provide a driving engagement of the driven clutch member 54 with the driving clutch member 56. (The spring 69 yields to permit the drive pawl end 67a to ride over the periphery of cam 60 as shown in FIG. 2.) After this connection between said clutch members has been made, the driven clutch member 54 follows the counterclockwise rotation of the driving clutch member 56, the parts being in the relative positions shown in FIG. 3.

Thus, while both clutch members 54 and 56 travel together in a clockwise direction, when the direction of rotation of the driving clutch member 56 is reversed, the driven clutch member 54 does not follow the driving clutch member 56 for the first revolution in a counterclockwise direction of the driving clutch member 56.

If, upon completion of the counterclockwise rotation of the members, the rotation of the driving member is again changed to clockwise, then with the reverse drive pawl end 67a already in the inner position shown in FIG. 3, the driven member is immediately reversed. The arcuate clearance between the pawl end 67a and the clutch shoulder 63a is slight and, when this clearance is taken up the movement between the members 56 and 54 is sufficient to release the right-hand end 65a of the clutch pawl 65 from shoulder 63b and permit the parts to assume the positions shown in FIG. 1.

I claim:

1. A lost revolution clutch comprising, a driving clutch member, a driven clutch member, a first clutch element carried on one clutch member and a cooperable first clutch element on the other clutch member, means on said one clutch member for maintaining said first clutch elements engaged during motion of said driving clutch member in a forward direction thereby driving said driven clutch member proportionately with the movement of said driving clutch member, a second clutch element on one clutch member and a cooperable second clutch element on the other clutch member, means normally maintaining said second clutch elements disengaged during rotation of said driving clutch member in the forward direction and during the initial revolution of said driving clutch member in a reverse direction, and means on said clutch members for engaging said second clutch elements upon completion of one revolution of said driving clutch member in a reverse direction.

2. A clutch as defined in claim 1 wherein the second clutch element on the one clutch member is carried on the first clutch element on said one clutch member.

3. A lost revolution clutch comprising, a driving clutch member, a driven clutch member, a first clutch pawl on said driven clutch member and a cooperable first clutch shoulder on said driving clutch member, means on said driven clutch member for maintaining said first clutch pawl and said first clutch shoulder engaged during motion of said driving clutch member in a first direction thereby driving said driven clutch member proportionately with the movement of said driving clutch member, a second clutch pawl on said driven clutch member and a cooperable second clutch shoulder on the driving clutch member, means normally maintaining said second clutch pawl and said second clutch shoulder disengaged during rotation of said driving clutch member in said first direction and during the initial revolution of said driving clutch member in a reverse direction, and means on said clutch members for engaging said second clutch pawl and said second clutch shoulder after one revolution of said driving clutch member in a reverse direction.

4. A lost revolution clutch comprising, a driving clutch member, a coaxial driven clutch member, a first clutch pawl pivotally mounted on said driven clutch member for driving the latter in one direction, a second clutch pawl pivotally mounted on said first pawl for driving said driven clutch member in the opposite direction, means providing a first clutch shoulder on said driving clutch member engageable by said first clutch pawl for driving the latter in one direction, means providing a second clutch shoulder on said driving clutch member engageable by said second clutch pawl for driving the latter in the opposite direction, means on said clutch members for normally disengaging said first clutch pawl from said first clutch shoulder when said driving clutch member drives in said opposite direction and during the initial revolution of said driving clutch member in said one direction, and means on said driven clutch member for engaging said first clutch pawl and said first clutch shoulder after one revolution of said driving clutch member in said opposite direction.

5. A lost revolution clutch comprising, a driving clutch member, a coaxial driven clutch member, a first clutch element pivotally mounted on said driven clutch member for driving the latter in one direction, a second clutch element pivotally mounted on said first clutch element for driving said driven clutch member in the opposite direction, a cam on said driving clutch member having a recess providing a first clutch shoulder engageable by said first clutch element for driving the latter in one direction, said recess providing a second clutch shoulder engageable by said second clutch element for driving the latter in the opposite direction, means on said clutch members for normally disengaging said first clutch element from said first clutch shoulder when said driving clutch member drives in said opposite direction and during the initial revolution of said driving clutch member in said opposite direction, and means on said clutch members for engaging said first clutch element and said first clutch shoulder after one revolution of said driving clutch member in said opposite direction.

6. A lost revolution clutch comprising, a driving clutch member, a coaxial driven clutch member, a clutch pawl pivotally mounted on said driven clutch member for driving the latter in one direction, a drive pawl pivotally mounted on said clutch pawl for driving said driven clutch member in the opposite direction, a driving cam on said driving clutch member having a recess providing a first clutch shoulder engageable by said clutch pawl for driving the latter in one direction, said recess providing a second clutch shoulder engageable by said drive pawl for driving the latter in the opposite direction, means for normally disengaging said clutch pawl from said first clutch shoulder when said driving clutch member drives in said one direction and during the initial revolution of said driving clutch member in said opposite direction, and means for engaging said clutch pawl and said first clutch shoulder upon one revolution of said driving clutch member in said opposite direction.

7. A clutch as defined in claim 6 wherein said driving cam also has a peripheral cam surface with a raised portion and a portion of said clutch pawl rides on said cam surface and is operated by said raised portion to engage the clutch pawl with the first clutch shoulder.

References Cited by the Examiner

UNITED STATES PATENTS 2,799,374  7/1957  Salome et al. _____ 192—30

FOREIGN PATENTS 998,105  7/1965  Great Britain.

DAVID J. WILLIAMOWSKY, *Primary Examiner.*